United States Patent

[11] 3,629,512

[72] Inventor William K. C. Yuan
186 Birch, Park Forest, Ill. 60466

[21] Appl. No. 855,983
[22] Filed Sept. 8, 1969
[45] Patented Dec. 21, 1971

[54] PATH SELECTION SYSTEMS
16 Claims, 8 Drawing Figs.

[52] U.S. Cl. .......... 179/18 GE, 179/18 E
[51] Int. Cl. .......... H04q 3/42
[50] Field of Search .......... 179/18 GE, 18 GF

[56] References Cited
UNITED STATES PATENTS
3,489,856 1/1970 Brightman .......... 179/18 GF

*Primary Examiner*—William C. Cooper
*Attorney*—Alter, Weiss and Whitesel

ABSTRACT: Path selection systems for use in selecting paths in multistage cross-point-type networks. Scanner operated control circuits at both ends of the network are provided that in conjunction with a request for service signal are capable of testing every possible path and cutting through the path that successfully traverses all stages. The control equipment then holds the connection and blocks busy verticals. The system is extremely reliable and uses a minimum of control equipment.

INVENTOR
WILLIAM K. C. YUAN

BY Alter and Weiss
ATTORNEYS

INVENTOR
WILLIAM K.C. YUAN

BY *Alter and Weiss*
ATTORNEY

INVENTOR
WILLIAM K.C. YUAN

BY *Alter and Weiss*
ATTORNEYS

INVENTOR
WILLIAM K.C. YUAN

PATH SELECTION SYSTEMS

This invention relates to electrical switching systems and more particularly to path selection systems for use with electrical switching systems such as those used in telephony.

The communication industry is continually striving to obtain economical and efficient path selection systems. Many such systems especially those used for switching through matrices of cross point multiples use expensive and complicated control circuitry for switching selected cross points to form a path between desired inputs and outputs.

Recently, switching networks have been constructed using solid state cross points. These solid state cross points have been utilized most efficiently in what is commonly known as self-seeking networks. In this system of path selection, control voltages are placed at the input of the network and at the desired output. The voltage differences between the input potential and the output potential cause breakdowns in the solid state devices which extend from the input to the output in a purely random manner. On a small scale, no intermedial control circuitry such as scanning devices or counting devices are required.

Theoretically and on a small scale such systems have proved reliable, efficient, as well as economical. The main advantage offered by such systems has been that control circuitry is minimized. However, such networks have disadvantages. For example, the breakdown point of the solid state devices vary extensively as a function of both signal amplitude and rate. Further the PNPN diodes used in such matrices are relatively expensive and have not proven sufficiently reliable because of the narrow acceptable diode tolerances required.

Another limitation in networks using solid state cross points is due to the inherent characteristics of the cross point elements wherein the transients caused by pulses such as used in the transmission of data or telegraphic signals tend to result in false operations. To overcome these difficulties reed relays have been used in conjunction with PNPN diodes as cross point elements in self-seeking networks. Thus in matrices using reed relays in the cross points the cross points themselves are unduly complicated. The complication is compounded since in the past dual winding reed relays have been required for such circuits with one winding used for firing or operating the relay and one winding for holding the fired path.

In summary, then the presently available path selecting circuits either require expensive and complicated control equipment, complicated cross point elements, or are limited in use.

Accordingly, an object of the present invention is to provide path selection circuitry which combines the simplicity of self-seeking features with the range of usefulness of the systems using complicated control equipment in determining the pathways through the network. The combination is such as to keep the control circuitry minimized.

A related object of the invention is to utilize single winding reed relay type cross points.

Yet another object of the invention is to provide path selecting networks using simple counters for controlling the cross point switching elements which are extremely flexible whereby the system performs the functions of the old and reliable path selecting networks utilizing vast amounts of control equipment without actually having such great amounts of control equipment.

A preferred embodiment of the invention comprises a cross point network having a plurality of stages. The path is selected when a potential is placed on an input seeking service and on a desired output such as link or register circuits. Counter type scanning circuitry controls the firing through the first stage for connecting the first and second stages. The link circuits or register circuits at the outputs are allotted by counterlike scanning circuitry and control the connections between the second and third stages and between the third stages and the output circuit. The cross point elements are arranged to be blocked, switched and busied under the control of a combination of request for service signals, first scanner signals and signals received from the output links or registers.

The above-mentioned and other objects and features of the invention and the manner of attaining them will become more apparent and the invention itself will be best understood by reference to the following description of embodiments of the invention taken in conjunction with the accompanying drawings; wherein.

Figure 6:
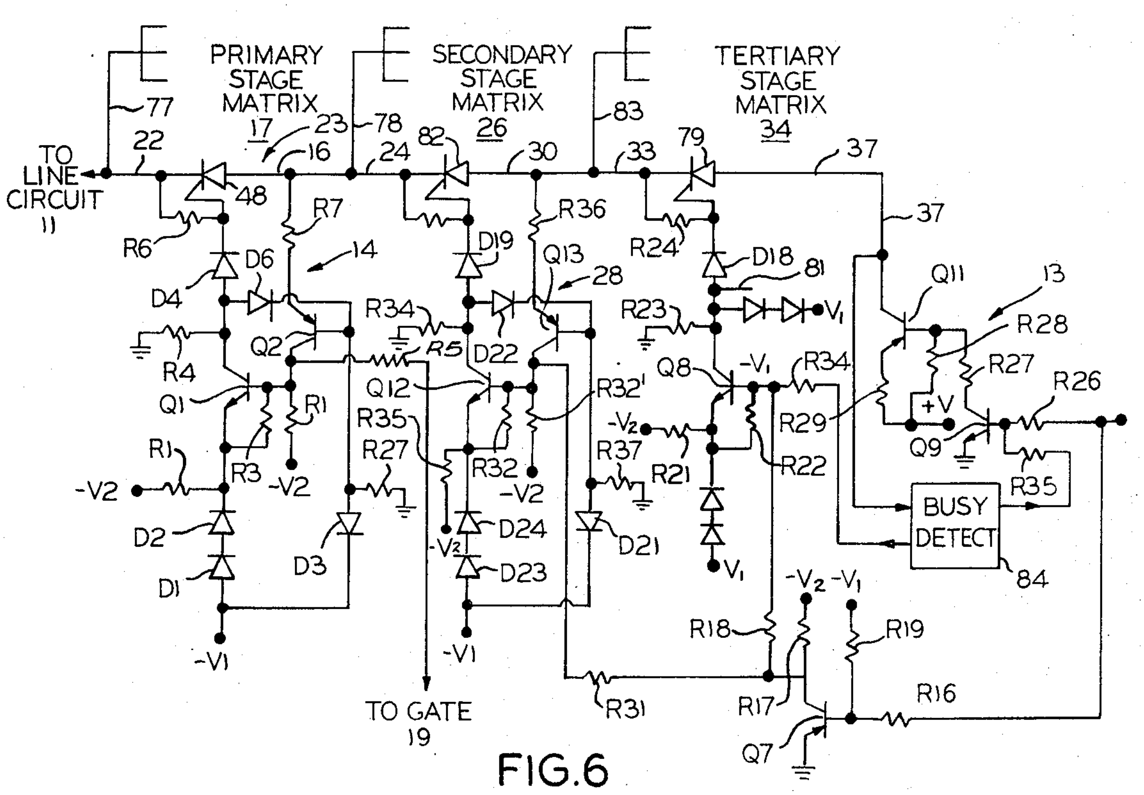
Figure 7:
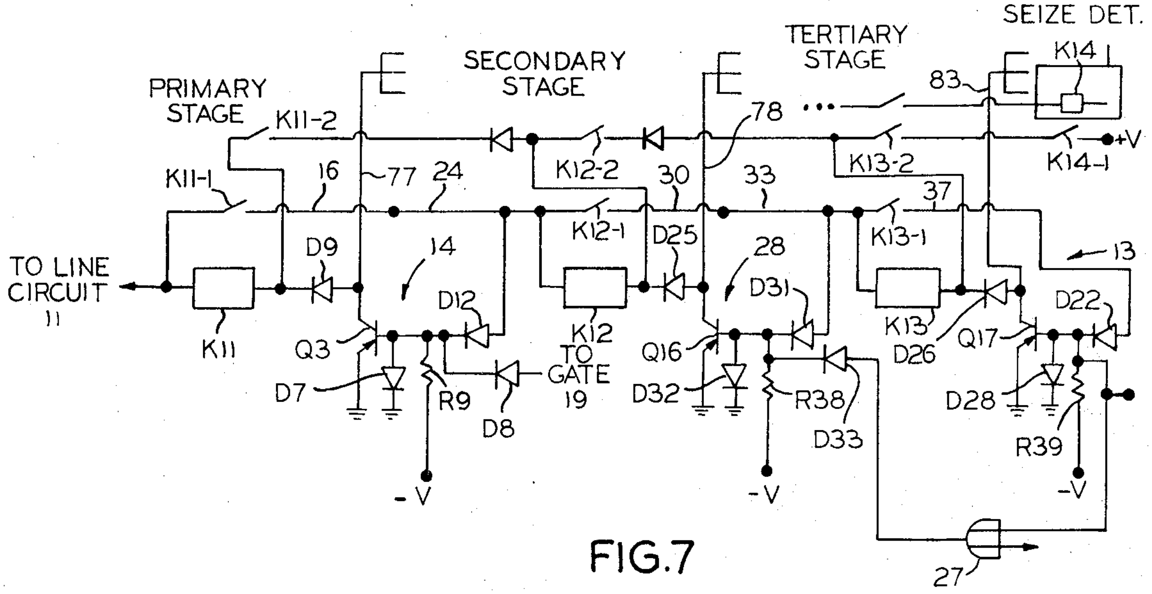
Figure 8:
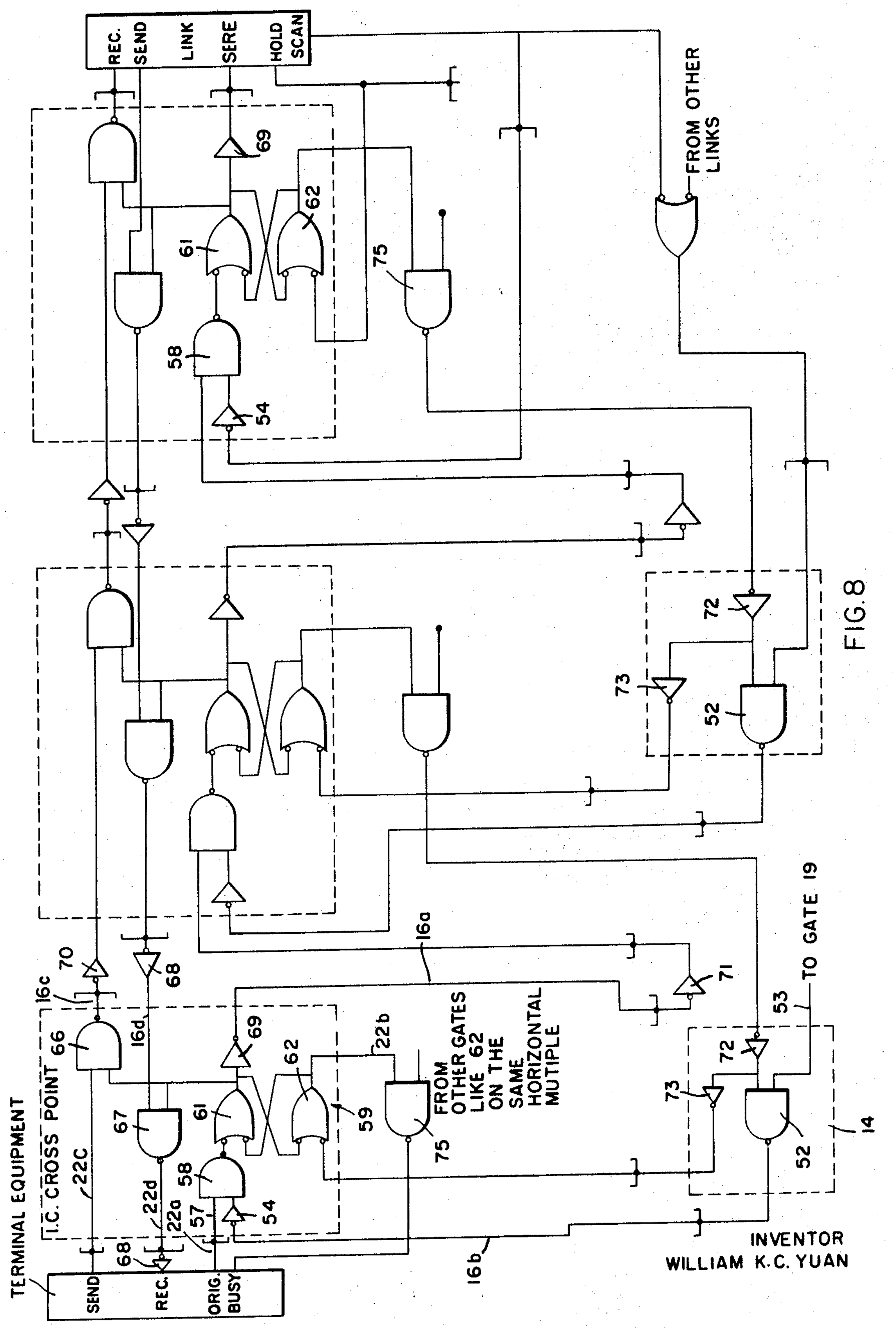

FIG. 6 schematically shows the path through three stage network having silicon controlled rectifier cross point elements and the control circuitry associated with the stages;

FIG. 7 schematically shows the path through a three stage network having reed relay cross point elements and the control circuitry associated therewith; and FIG. 8 schematically shows the path through a three stage network having an integrated circuit or transistor cross point elements with associated control circuitry.

Figures 1, 2, 3:
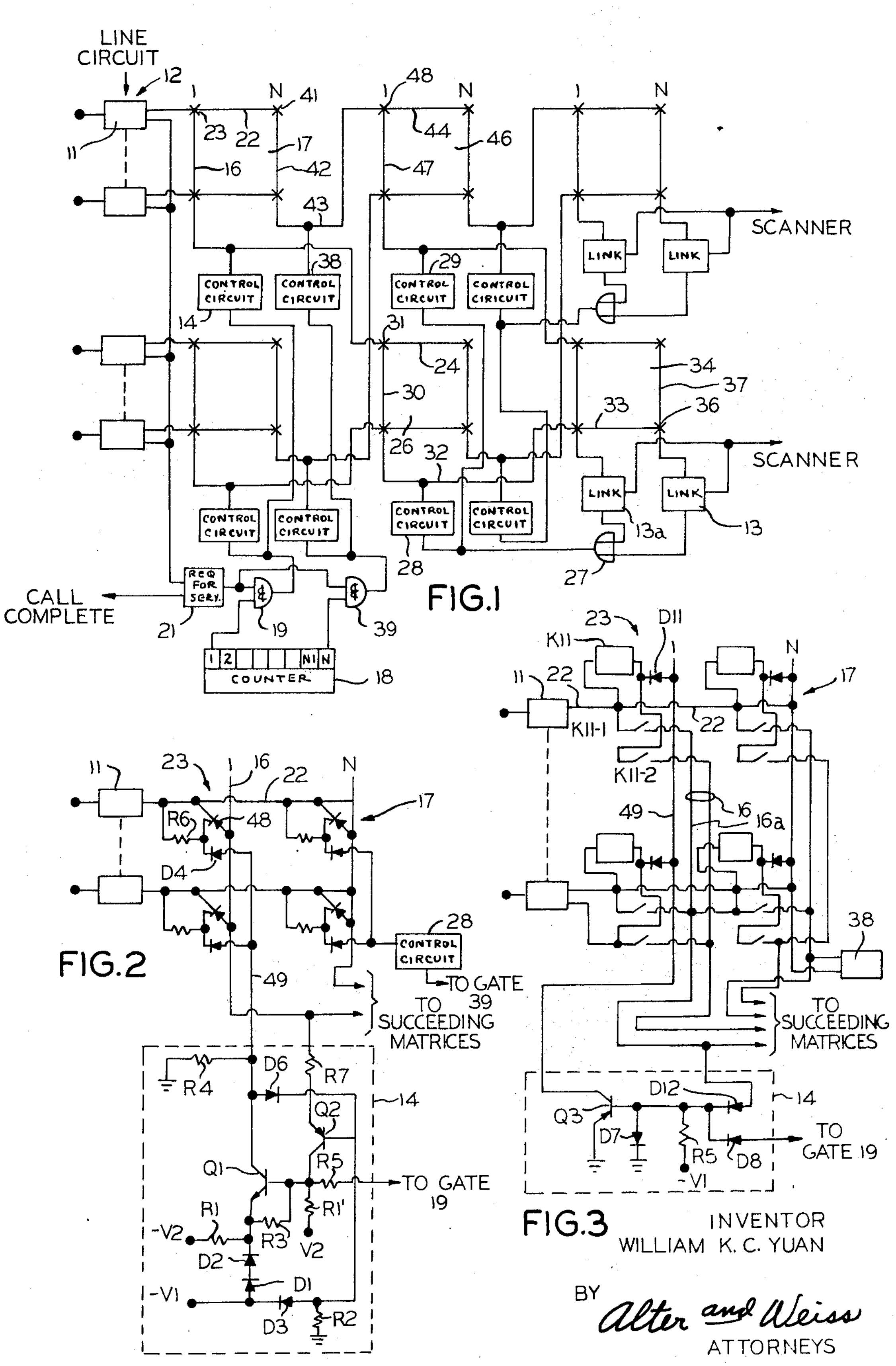
FIG. 1 is a block diagram of a preferred embodiment of the scanner controlled inventive path selection system showing line circuits at the input and link circuits at the outputs.
FIG. 2 is a schematic representation of a primary stage showing the cross points utilizing silicon controlled rectifier for the cross point elements and also showing the minimal control circuitry needed for operating the cross points under the direction of counterlike scanners.
FIG. 3 is a schematic representation of a primary stage showing the cross points utilizing reed relays for the cross point elements and also showing the minimal control circuitry needed for operating the reed relay cross points under the direction of counterlike scanners.

FIG. 1 shows in block diagram form a three stage switching network utilizing the invention. Each stage comprises a column of matrices having a plurality of overlapping horizontal and vertical multiples or conductors.

As shown in FIG. 1 the horizontal multiples are coupled to the inputs of the respective stages and the vertical multiples are coupled to the outputs of the respective stages. Thus, the verticals of the preceding stages are coupled to the horizontals of the succeeding stages. The "X's" at the point of overlapping of the horizontals and vertical multiples represent cross point elements which can be actuated to interconnect the horizontal and vertical conductors thereat.

While there may be a larger number of matrices per stage than is illustrated in FIG. 1, for purposes of simplicity in describing the invention only two of the matrices per stage is shown. Similarly, while in actuality, each matrix may have a plurality of horizontals and verticals, nonetheless, only the first and last horizontals and verticals are shown for each of the matrices. Also, while there are two appearances for each link at the output of the matrix; one for the originating party and one for the terminating party, for simplicity any one appearance is shown in FIG. 1.

The preferred embodiment of the invention shown in FIG. 1 is used for selecting a path through the primary, secondary, and tertiary stages of the switching network from a line circuit such as line circuit 11, for example, of the group of line circuits 12 to the output circuits such as link circuit 13 coupled to the outputs of the tertiary stage.

It should be noted that while link circuits are shown as coupled to the outputs other type circuits such as registers could replace the link circuits.

Means such as control circuits are provided for enabling or blocking each of the verticals. More particularly, control circuit 14 for example enables the first vertical 16 of matrix 17 in the primary stage. The control circuits also act to block or "busy out" any vertical being used in a selected path.

Means are provided for actuating the control circuits that are coupled to the verticals of the first stage. These are the control circuits that control the cross point elements which interconnect the horizontals and verticals of the first stage to consequently interconnect multiples in the primary stage to multiples on the secondary stage. More particularly, a counter-type scanner such as counter 18 is provided for actuating all of the control circuits coupled to the verticals of the first stage in a sequential manner.

Means are provided for preventing direct connections between more than one line circuit and a single vertical, unless a conference call arrangement is desired. The means shown in FIG. 1 include gates, such as gate 19, connected to the counter 18 outputs. For example, if the telephone at the subscriber station coupled to line circuit 11 is in the "off hook" condition while it is scanned a request for service signal is sent to the request for service circuit 21. The scanner remains at the "off hook" scanned line circuit until it is connected to a link or register. When such a connection is made then a call complete signal causes the scanner to continue its cycle.

The switching in this system occurs at such high speeds that the calls are not delayed thereby. It should be understood that many other means can be used to assure that only one line circuit can be connected through to any one vertical at any given time.

Responsive to the receipt of signals from both the counter 18 and circuit 21 gate 19 sends a signal to all the control circuits responsible for the operation of the cross points at the first verticals of each of the matrices of the primary stage. In the example, being described the signal from gate 19 would cause control circuit 14 to enable or prepare all cross points associated with vertical 16. When the cross points associated with vertical 16 are enabled the signal from line circuit causes cross point element at cross point 23 to fire and interconnect horizontal 22 and vertical 16 thus extending the path from line circuit to horizontal 24 of matrix 26 of the secondary stages.

At the same time a counterlike scanner not shown but similar to scanner 18 scans the output circuits such as links 13 and **13*a* on a one-at-a-time basis. Responsive thereto, means for preparing the verticals of the matrices in the second and third stages are operated. More particularly, the scanned links send signals which actuate gate means such as gate 27 to transmit signals to the control circuits such as control circuits 28, 29** of one vertical per matrix in the secondary stages, thus enabling one vertical per matrix in that stage (unless a vertical is busy). Since the links connected to the verticals of each matrix in the tertiary stage are sequentially scanned all of the verticals of the matrices in the tertiary stage are sequentially enabled (except for busy verticals).

Thus, in the example of FIG. 1 vertical 30 of matrix 26 is enabled. Since, there is a signal from the primary stage on horizontal 24 while vertical 30 is enabled cross point 31 switches through. When cross point 31 switches it extends the demand for service signal received from the primary stage through the vertical 30 over cable 32 to horizontal 33 of tertiary matrix 34. Assuming that link 13 is being scanned then vertical 37 is enabled at this time. Therefore, cross point 36 switches and connects the call through vertical 37 to link 13.

Responsive to the connection through vertical 37 to link 13 the link transmits a hold signal through the connected matrices to hold the connection and busy out the verticals used in the connection.

In the example, if the subscriber at line circuit 11 initiates the call when control circuit 38 was energized by gate 39, (scanner at position N) then cross point 41 would switch through extending the signal from line circuit 11, horizontal 22, cross point 41, vertical 42 and cable 43 to horizontal 44 of secondary matrix 46. To reach matrix 34, vertical 47 connected to control circuit 29 would have to be used. If vertical 47 is busy when cross point 41 switches there is no path to reach the link to cause the cross points to hold in the switched condition. Consequently, cross points such as 41 return to the normal nonconducting condition and another vertical in the primary stage is tried. Thus, the switching between the primary and secondary stages occurs in a step by step cut and try manner depending on the success in getting from the secondary to the tertiary stage.

Details of the path selection system when silicon controls rectifiers are used as cross point elements are shown in FIG. 2. Thus, FIG. 2 shows cross point 23 of matrix 17 of the primary stage and control circuit 14 in detail in schematic form.

The control circuit 14 comprises transistors as the active elements and diodes for properly separating and distinguishing voltage conditions. The control circuits act under the direction of the counter 18 to block the cross point element, to enable the verticals by properly biasing the cross point switching elements. The control circuits also act to busy out the vertical when a path is connected.

More particularly, as shown control circuits such as circuit 14 comprise a NPN-transistor Q1 and a PNP-transistor Q2. Transistor Q1 is normally biased to conduct and transistor Q2 is normally biased to be in a nonconducting condition. The cross point switching elements, such as SCR 48 at cross point 23 are normally reverse biased by the control circuit so that there is no conduction from horizontal input 22 to vertical output 16. The reverse bias is obtained because transistor Q1 conducting places the potential of its emitter, at the gate of the SCR 48. The enabling occurs when transistor Q1 is blocked by a signal from gate 19 forward biasing the SCR elements associated with vertical 16. The vertical 16 is busied out when the path is established and a signal is received from the link which switches on transistors Q2 and Q1.

In the exemplary circuitry shown in FIG. 2 the biasing voltages on transistor Q1 include negative voltage V2 applied to the emitter of transistor Q1 through resistor R1 and negative voltage V1 applied to the emitter of transistor Q1 through two diodes D1, D2. A regulating diode D3 is coupled from voltages source V1 to ground through resistor R2. In practice V2 is twice V1.

Base biasing resistors R1′ and R3 acts to bias transistor Q1 so that the base when free from external signals is maintained relatively negative thereby maintaining Q1 in a nonconductive condition. However, in the nonallotted condition; i.e., without enabling signal from the gate 19, a ground signal is received at the base of transistor Q1 through resistor R5 from gate 19 to hold transistor Q1 in its conducting stage by negating the base bias voltage.

The value of the resistor R1 is such that the voltage at the emitter of transistor Q1 is −V1−2 volts, or in practice approximately −14v. The off hook signal indicating that line 11 requests service is less negative or relatively compared to this emitter voltage i.e., −12 volts.

The cross point 48 comprises a gate biasing diode D4 and a resistor R6. The gate biasing diode is coupled between lead 49 and the gate of SCR 48. Lead 49 extends from the collector of transistor Q1. Resistor R6 is connected between input horizontal 22 and gate of SCR 48. Because of the reverse biasing of gate diode D4, silicon control rectifier 48 does not conduct responsive to an off hook signal from line circuit 11 in the nonallotted condition of control circuit 14.

Thus, with transistor Q1 conducting the negative voltage from the emitter of transistor Q1 is on the anode of diode D4 reverse biasing it and effectively inhibiting SCR 48.

Means are provided for unblocking the SCR 48 responsive to an allotting signal received at circuit 14 from gate 19. More particularly, when an allotting signal is received from counter 18 through gate 19, the ground voltage applied by gate 19 to the base of transistor Q1 via Resistor R5 is removed causing transistor Q1 to switch to its nonconducting state because of the −V2 applied to its base. A voltage positive compared to V1 is transmitted through diodes D3, D6 and lead 49 to the anode of diode D4 which thereby forward biased because this voltage is more positive than the off hook voltage.

Accordingly, SCR 48 with gate diode D4 forward biased is enabled and will switch on if the voltage on its anode is slightly positive relative to the voltage on its cathode. When SCR 48 switches on input horizontal 22 is connected to vertical 16 and to the input of a matrix in the succeeding stage.

As will be explained later, a positive voltage is received at multiple 16 from the link control at the output of the network. The positive voltage on the vertical 16 switches on SCR 48 and also is applied to the emitter of transistor Q2 through resistor R7 causing transistor Q2 to draw sufficient current to counteract the negative bias voltage V2 applied to the base of transistor Q1 via resistor R1. Transistor Q1 is thereby switched on regardless of the signal from gate 19. With transistor Q1 on the gate diodes associated with control circuit 14 such as diode D4 are all reversed biased and thus the vertical 16 remains disabled to all other cross points. The reverse biasing of gate diode D4 does not affect the switched SCR 48. If the link voltage isn't received then transistor Q2 remains nonconducting or switches off. When transistor Q2 doesn't conduct, transistor Q1 switches on responsive to a nonallotted ground signal from gate 19 to once again block out the cross points associated with vertical 16.

Other cross point elements can be used to switch through from the horizontals to the verticals. The other elements must also be capable of being blocked, enabled and being held while other associated elements are simultaneously blocked.

FIG. 3 schematically shows another embodiment featuring reed relay cross points which operate in much the same manner as the embodiment of FIG. 2. Therein, when a subscriber associated with line circuit 11 goes off hook a negative request for service voltage is applied to line multiple 22. However, no cross point switching occurs until the control circuit 14 places a proper signal on the opposite side of the coil of reed relay K11 or any of the other reed relays attached to the verticals of the matrix 17.

Means such as control circuit 14 are provided for enabling the verticals. It should be noted that transistor Q3 is normally nonconducting because of the positive voltage applied through diode D8 from gate 19 when it is not allotted. The positive voltage acts to cancel the negative voltage on the other side of resistor R5 at the base of transistor Q3. Base diode D7 is also attached between the base of transistor Q3 and ground to provide a current path for the positive voltage received from the connected link circuit through isolating diode D12. When transistor Q3 is switched on by the removal of the positive signal when gate 19 is allotted, ground is supplied to the coil of the reed relay K11 at cross point 23 of matrix 17. The ground extends through transistor Q3, diode lead 49 and the coil of the reed relay K11 to a request for service negative voltage on lead 22 received from line circuit 11.

Responsive to the potential difference across the reed relay, operating current flows through the reed relay coil. Responsive to the operation of relay K11 contacts K11–1, K11–2 close to connect horizontal 22 to vertical 16.

The operation of contacts K11–1 extends the demand for service signal of line circuit 11 to the following stage and also acts to transmit the holding signal received from the link via K11–2 through diodes D12, D7 to ground to hold relay K11 operated and to switch transistor Q3 to its nonconducting state to block all other relays associated with the vertical 16.

Figure 4:
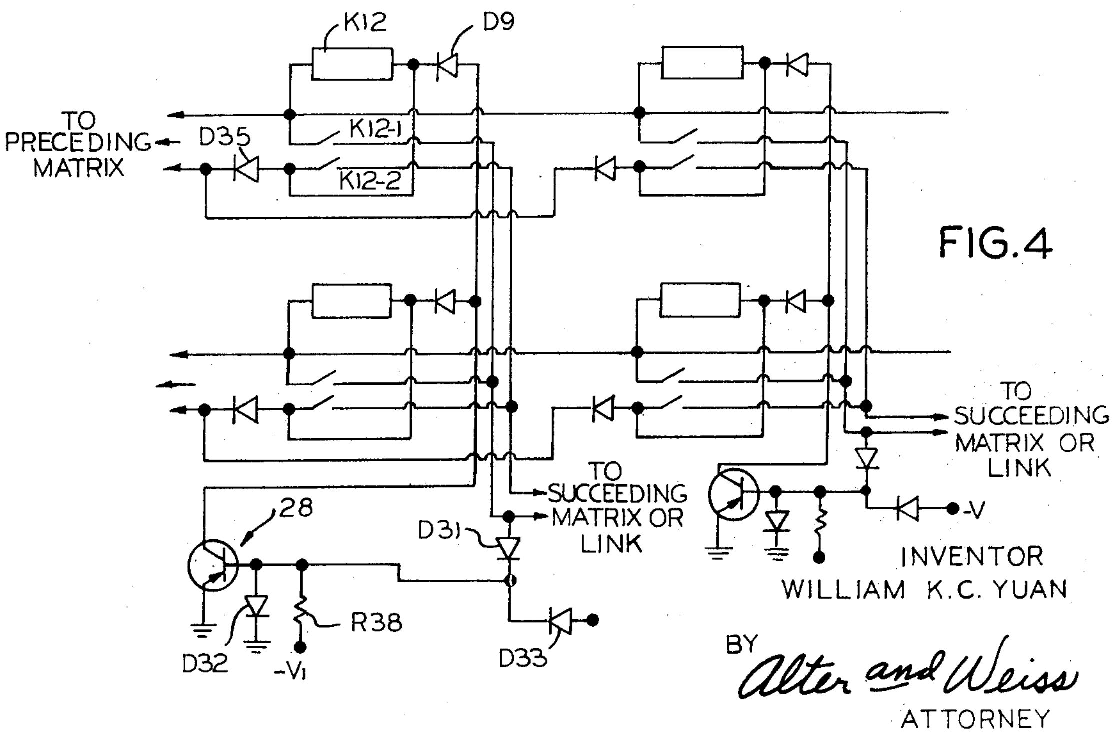
FIG. 4 is a schematic representation of the secondary or third stage showing cross points utilizing reed relays.

As will be explained in conjunction with FIGS. 4 and 7, when a path is switched through from the line circuit to a link, the link detects this and actuates a relay, for example, to apply a holding voltage (+V) to the K–2 contacts of the relays associated with the link. The voltage is propagated through the tertiary stages and secondary stages via the closed K–2 contacts and isolation diodes such as diode 35 to the primary stage. The isolation diodes prevent the positive voltage from switching on other relays on the same horizontals as the operated relay. The relay hold circuit path is provided by the positive voltage extended through the operated K–2 contacts, the relay coil, the operated K–1 contact, the diodes D12 and D7 (see FIG. 7). The base voltage of transistor Q3 will be driven positive. Therefore, Q3 is switched off and all other relays associated with the vertical are blocked. The path is disconnected when the line goes on hook. The link will detect this condition and switch off the seize detect relay. The positive voltage is removed. All the relays associated with the switched path will become nonoperative.

Figure 5:
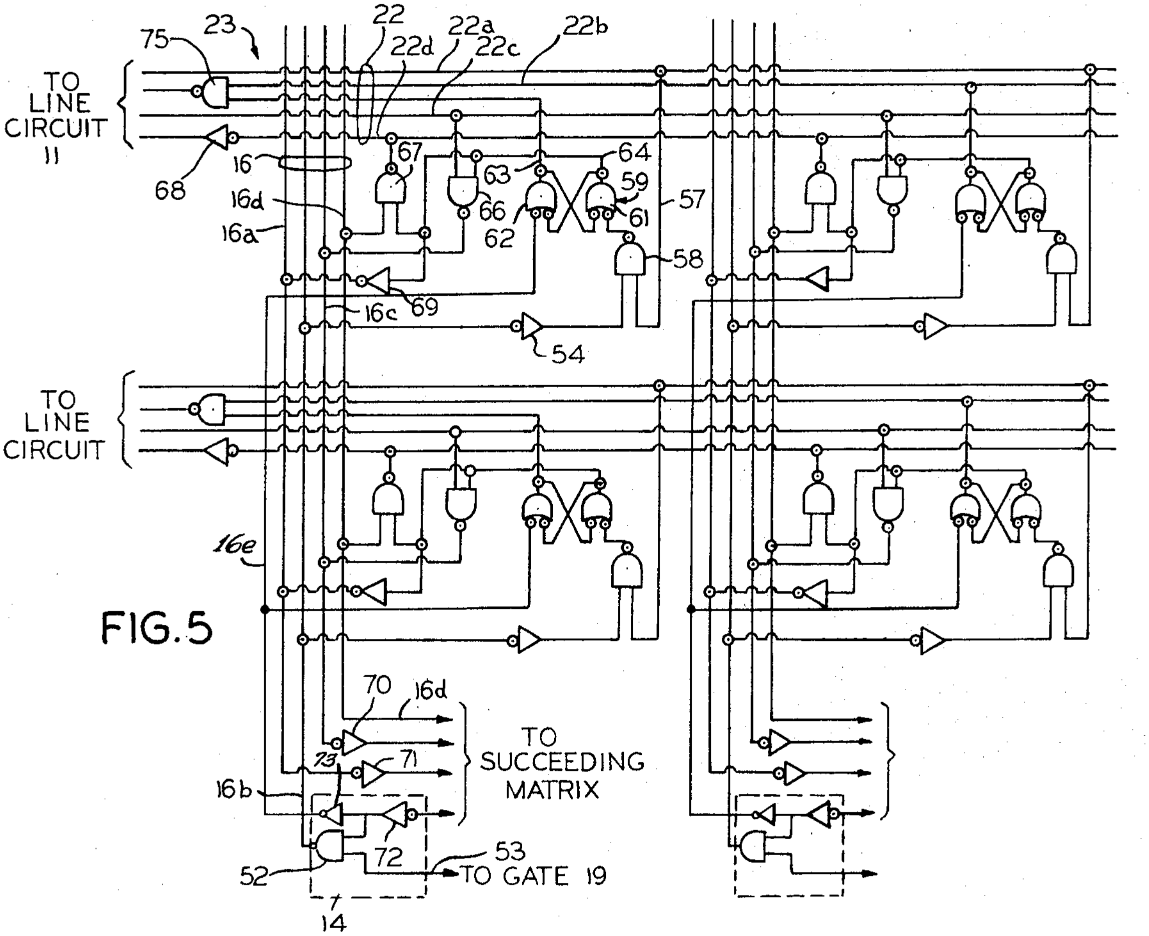
FIG. 5 is a block diagram representation showing the cross points utilizing integrated circuits as the cross point elements, along with a block diagram of the minimal control circuitry used for operating the integrated circuit cross points under the direction of counterlike scanners.

It is also within the scope of this invention to utilize integrated circuitry to provide the means for selecting the path through the matrices. An embodiment of integrated circuitry utilized at the cross points and in the control circuit is shown in FIG. 5. Thus, what is shown in FIG. 5 is very similar to what was shown in FIGS. 2 and 3. That is, four cross points and two control circuits are shown.

The discussion to follow revolves around a single one of the cross points in a manner similar to the explanation used in FIGS. 2 and 3. Wherever possible, the same identification numbers are used, among other things, to emphasize the similarity between the mode of switching utilized in all three embodiments. Integrated circuitry (IC) components, as is known, are especially amenable when the switching network is used for data transmission.

As shown in FIG. 5, cross point 23 is the multiple crossover point of input horizontal 22 and vertical output 16. All of the cross points shown are detailed descriptions of the system of FIG. 1. For example, they are located in matrix 17 of the primary stage. Of course, all the first stage cross points operate in the same manner as cross point 23 under the control of control circuit 14. That is the control circuit 14 acts in conjunction with the cross points to block the cross points and to inhibit them from switching unless there is a simultaneous receipt of the request for service signal from the line circuit along with a signal from the control circuit in response to a signal received from the counter 18. The signal received from the counter could of course come indirectly through a gate circuit such as gate 19 shown in FIG. 1. When a request for service signal and an allotting signal from the scanner 18 enabling the control circuit are received simultaneously then the cross point is switched through. Thereafter, the control circuit acts in conjunction with the cross point to hold the cross point element switched and to prevent other cross point elements on the same vertical from switching.

The IC circuitry of FIG. 5 which may be supplied in NXN matrix units accomplishes these functions. More particularly, initially when there is no signal from gate 19, the output of the control circuit 14 is a mark or high-voltage output on lead 16*b* extending from the output of gate 52. When gate 19 receives the signal from counter 18, then a high-voltage signal is put on input 53 of gate 52 thereby causing gate 52 to put out a low-voltage signal on lead 16*b*. The low-voltage signal on lead 16*b* is coupled into inverter 54. Thus, the low-voltage signal is extended through lead 16*b* when the scanning counter 18 is emitting a signal from the vertical 16 associated with control circuit 14.

If, at that time, the subscriber set attached to line circuit 11 goes off hook a high-voltage signal is received over lead 22*a* and extended through lead 57 to gate 58. Gate 58 is a gate that operates responsive to the simultaneous receipt of two high-voltage signals and its output is a low-voltage signal. Thus, at the output of gate 58 a low-voltage signal is then obtained. The low-voltage signal is transferred to the set input S of flip-flop circuit 59. Flip-flop circuit 59 is comprised of gates 61, 62 connected with their outputs cross connected to the other gate input so as to form the flip-flop circuit. At this time both gates 61 and 62 are switched on.

Flip-flop circuit 59 normally has high-voltage output at lead 63 leading from gate 62. However, when control circuit 14 is allotted when the line circuit demands service, a low-voltage signal is placed on the set input of flip-flop 59 causing gate 61 to be active and put a high-voltage signal on lead 64. A low-voltage signal is also placed on the second input of gate 62 from 16*e* thereby maintaining gate 62 on. A high-voltage is then also obtained at the output of gate 62.

The high-voltage output on lead 64 is used for a multiplicity of functions. First, it is fed into an input of gate 66 to enable that gate. That gate is connected to lead 22*c* of horizontal input 22. Thus, the communication signal from line circuit 11 on lead 22*c* is enabled to pass through gate 66 and onto lead 16*c* of vertical 16.

The high-voltage output on lead 64 further enables gate 67. Gate 67 in operating interconnects lead 16*d* of vertical 16 and lead 22*d* of horizontal 22. These are the leads over which transmission is received at the line circuit from the subsequent connections through the path selected by the system described herein. The low-voltage signals on lead 22*d* pass through an inverter 68 leading to the line circuit. Thus, the low-voltage signal is inverted into a high-voltage signal at inverter 68 prior to being coupled to the line circuit 11.

The high voltage on lead 64 is further transmitted through inverter 69 to lead 16*a*. That lead is used to extend the high-voltage request for service signal to succeeding matrices after it is transferred through another inverter 71 which converts the low voltage to a high voltage for use at the input of the succeeding matrices.

Thus, responsive to a high-voltage signal on input lead 22*a* occurring simultaneously with the high-voltage signal from allotter gate 19, gate 58 operates to set flip-flop 59 and provide a low-voltage output signal at vertical 16*a'*. Thus, at this point the cross point 23 is switched over and the IC cross point elements are in use interconnecting the input horizontal and the output vertical.

Means are provided for maintaining the cross point switched over and for blocking the vertical to prevent other line circuits from being connected to the busied vertical. For example, if another cross point on vertical 16 were switched when a high-voltage signal is received back from the link circuit via the secondary and third stage matrices after path was connected, the high-voltage signal would go through inverter 72 of control circuit 14 and thus places a low-voltage signal on gate 73 and gate 52. The IC circuitry of FIG. 5 which may be manufactured by means of large scale integration in NXN matrix units accomplishes these functions. When vertical 16 is not allotted and is not busy, the inputs to the control circuit 14 are both low; the input to inverter 72 is low, and the input to gate 52 from gate 19 is low. Therefore, the inputs to gate 52 are one high and one low, and the output of gate 52 is high. The high voltage on lead 16*b* is coupled into inverter 54 and gate 62. Since the input to inverter 54 is high, its output will be low, and this low voltage will inhibit the output of gate 58 from going low. If there is a request for service on line circuit 11, the signal on lead 22*a* will be high. The signal on lead 22*a* is coupled into gate 58. Therefore, gate 58 has one input high and one input low. Hence, the output of gate 58 remains high.

When control circuit 14 is allotted, the input to gate 52 from gate 19 will go high. As a result, the output on lead 16*b* will be low. The inhibit on gate 58 is removed. If 22*a* is high, the output of gate 58 will become low. Both gates 61 and 62 of flip-flop 59 will be switched on. The output of gate 61 is high, and the output of gate 62 is high. The high output of gate 61 couples into gate 66, gate 67 and inverter 69. The output of inverter 69 goes through 71 to pass on the request for service signal to a succeeding matrix. (The output of 71 will go to a secondary matrix corresponding to lead 22*a*).

If a path is connected from the line circuit to a link, a high voltage will be returned via the tertiary and secondary matrix to the input of inverter 72. As a result, the output of gate 52 will be high regardless of the input voltage from gate 19. This high voltage on 16*b* will busy out vertical 16 to prevent it from being seized by other line circuits. Flip-flop 59 is now set, gate 61 is on (output high), and gate 62 (output low) is off. Gate 66 connects 16*c* and 22*c* and will transmit digital data via inverter 70 to the succeeding matrix. Gate 67 connecting 16d to 22*d* will receive digital data from the succeeding matrix. The low-output voltage of gate 62 will cause the output of gate 75 to become high. The output of gate 75 being high will indicate to the line circuit 11 that a path has been established. The secondary matrix is identical to FIG. 5. The output of a gate in the secondary matrix is similar to gate 75 will couple a high voltage to the input of inverter 72 and thus busy out vertical 16. The tertiary matrix is identical to FIG. 5. After the link detects a seize condition by means of a gate similar to gate 70 of FIG. 5, it will apply a high voltage to an inverter similar to inverter 72. In this way, the verticals of the connected path are blocked. Thus it is seen that the IC circuitry provides control circuit and cross point elements which function to enable the cross point to hold the cross point switch and to block and inhibit the vertical to all other calls when the vertical is busied on any one call.

It should be noted further that the output of flip-flop 59 on lead 64 could be used to control relays instead of gates 67 and gate 66. Further, the IC circuitry at the second and third stages operates in much the same manner but under the control of the link circuit through which the calling party is connected. It should be understood that many variations of the circuitry shown in FIGS. 2, 3 and 5 can be utilized. The functions of the circuitry is to first block, then enable and then prevent the other cross points from operating at the busy vertical.

FIGS. 6 and 7 show complete paths from the line circuit to the link circuit. FIG. 6 shows the circuitry using SCR cross point switching elements therein. Means such as control circuit 14 are shown for enabling a vertical in the first stage such as vertical 16.

More particularly, when a signal is received from gate 19 responsive to a signal from counter 18 the normally conducting transistor Q1 is switched off. It should be recalled that when transistor Q1 is conducting a high-negative voltage is applied to gate diode D4 reverse biasing that diode and blocking SCR 48 to keep it from conducting, even when a negative demand for service signal is applied to its cathode. When transistor Q1 turns off all the gate diodes associated with vertical 16 such as gate diode D4 are enabled. Assuming that a demand for service signal is received from line circuit 11 over input 22, then the SCR 48 switches on since the signal on 22 is more negative than gate voltage. Lead 77 and the associated crossing elements indicate a plurality of cross point multiples.

The demand for service signal is extended over vertical 16 through SCR 48 and is applied to input 24 of matrix 26 in the secondary stage. Here another lead and associated crossing element 78 indicate a plurality of cross point multiples associated with horizontal 24. At the same time a signal is received from the link circuits and particularly link 13.

It should be noted that the control of link circuit 13 are slightly different than the control circuit 14. However, it performs many of the same functions in the same manner as does control circuit 14.

The signal from the counterlike scanner (not shown) at the link circuit is a positive signal and it causes the normally conducting transistor Q7 to switch off. The positive signal from the scanner is applied to the base of transistor Q7 through resistor R16 switching that transistor off. When transistor Q7 switches off, the negative voltage attached to the collector of transistor Q7 through resistor R17 is applied to the base of transistor Q8 through resistor R18. Transistor Q8 which was conducting previously due to the ground applied to its base through conducting transistor Q7 and resistor R18 switches off.

It should be noted that transistor Q7 is maintained in its conducting condition when it does not receive the signal from the scanner by a negative voltage applied to its base through resistor R19.

When transistor Q8 conducts, a negative blocking voltage is applied to a gate diode D18, and over lead 81 to all the other gate diodes associated with the vertical under the control of link control circuit 13 in matrix 34. The negative voltage goes through resistor R21, transistor Q8 to the anode of diode D18 in cooperation with the regulated voltage applied by using well-known dropping diodes.

When transistor Q8 is turned off, a negative voltage less than −V is applied to the anode of gate diode D18 using a diode chain in cooperation with resistor R23 thus forward biasing that gate diodes so that when the negative voltage is received over horizontal 33 and through gate resistor R24 the SCR 79 conducts. Thus, in this manner, SCR 79 is enabled, and will switch when a negative voltage is applied to horizontal 33.

Also responsive to the positive signal from the scanner normally nonconducting transistor Q9 is switched to conduct. The positive voltage from the scanner or associated gate is applied to the base of transistor Q9 through resistor R26. Responsive to transistor Q9 switching to its conducting state ground is applied to the base of transistor Q11 through the emitter of transistor Q9, the collector of transistor Q9, and resistor R27.

The base of normally nonconducting transistor Q11 is connected to positive voltage through resistor R28. Responsive to ground being applied to the base of transistor Q11, that transistor switches to its conducting state, and a positive voltage is applied to vertical 37 through resistor R29, the emitter and collector of transistor Q11. Thus, the vertical 37 in matrix 34 of the tertiary stage is enabled responsive to a signal being applied to link 13 from the scanner.

In the meantime the negative voltage at the collector of transistor Q7 is applied to the base of transistor Q12 through resistor R31. Here again, Q12 is recognized as similar to transistor Q1, that is, it is normally conducting and transmits a blocking voltage. The negative voltage applied through the transistor Q12 to gate diode D19 reverse biases that gate diode and blocks SCR 82. However, because of the ground received through the normally conducting transistor Q7 transistor Q12 conducts.

The gate of the SCR 82 is forward biased when transistor Q7 is blocked to block transistor Q12, so that it is enabled and will switch on if a negative voltage is received at lead 24. Since SCR 48 is switched, the negative voltage is received at lead 24, and applied to vertical 30. Lead 83 and the cross conductors thereon indicate that the horizontal 33 which is connected to vertical 30 also crosses other multiplies besides vertical 37.

Responsive to the negative signal at horizontal 33 SCR 79 switches over. Positive voltage is sent originally from the link circuit through resistor R29 and transistor Q11, vertical 37, SCR 79, horizontal 33, vertical 30, SCR 82, horizontal 24, vertical 16 and SCR 48 to horizontal 22 to hold the line circuit.

The voltage level on vertical 37 is detected by a busy circuit 84. Responsive to the detection of the voltage level the busy detect circuit 84 places a positive voltage on the base of transistor Q8 through resistor R34; thereby turning that transistor on and once again blocking all the SCR's associated with vertical 37. SCR 79 continues to conduct, of course, because of the voltage difference thereacross and the current therethrough.

Responsive to the positive voltage signal on vertical 30, a relatively positive voltage signal is transmitted through resistor R36 in control circuit 28 to the emitter of transistor Q13 causing that transistor to conduct. Responsive to the operation of transistor Q13 to its conductive stage, transistor Q12 also reoperates due to the relative positive voltage transmitted through transmitter Q13 applied to the base of the NPN-transistor Q12. The base of transistor Q13 is biased by the voltage drop across resistor R37. When transistor Q12 reoperates to conduct negative voltage is applied to the gate diodes coupled to lead 86 to thereby block the vertical to any other calls, such as line circuits.

FIG. 7 shows a complete path from terminal equipment to links when reed relays are used as cross point elements. The secondary stage matrix is also shown in FIG. 4. As shown in the drawings, the first cross point element reed relay K11 is operated under the control of control circuit 14 which in turn is operated responsive to a signal received from gate 19 under the control of counter 18. The gate 19 in the nonallotted condition applies a signal to the base of transistor Q3 through diode D8. Responsive to the receipt of the positive signal at the base Q3 is normally nonconducting. Thus, when a negative demand for service signal is received on input lead 22, relay K11 is not operated. However, when gate 19 receives a signal from the counter, it removes the positive signal from the base of transistor Q3. Transistor Q3 is then switched on due to the negative voltage applied to its base through resistor R9.

When transistor Q3 is on, ground is applied to one side of the coil of relay K11 through the transistor Q3 and diode D9. Now, in this condition, the vertical is enabled, so that when a negative demand for service signal is received on input 22, relay coil K11 is energized, and contacts K11–1 close. When contacts K11–1 close, the negative signal is transmitted through the operated cross point to vertical 16, and from there is applied to one side of the coil of cross point element, reed relay K12 in the secondary stage.

Control circuit 28 in the secondary stage is operated responsive to the signal received from link 13. This signal is initiated by the scanner which applies timed scanning signals to the links. Normally, when not scanned a positive signal is received through OR-gate 27 and applied to the base of transistor Q16 in control circuit 28 to block the transistor.

When link 13 is scanned, then the positive voltage is removed. The removal of the positive voltage causes transistor Q16 to operate to its conducting condition due to negative base voltage applied through resistor R38. When transistor Q16 operates to its conducting position, ground is extended through the transistor Q16 and diode D25 to the other side of the coil of reed relay K12. Since negative voltage is applied to the line side of the coil of relay K12, it operates to close contacts K12–1 and contacts K12–2.

It should be understood that all of the contacts associated with the reed relay are not shown for the sake of clarity. Thus, the speech contacts are not shown. Only those contacts are shown which are necessary to understand the control equipment utilized in selecting a path through the switching network. Contacts K12–1 close to transmit the negative signal from input horizontal 24 to output vertical 30. The contacts K12–2 are used in the circuitry for holding the relay operated after the path is completed.

The operation of the control equipment in link 13 is similar to that discussed with regard to the control circuit 28. More particularly, transistor Q17 is normally held off by a positive signal received at the base of transistor Q17 from equipment associated with the scanning equipment. The positive signal maintains Q17 in its nonconducting state. Thus, the coil of relay K17 cannot operate since it is not contained in a complete circuit. When link 13 is scanned the positive voltage is removed and transistor Q17 operates to its conducting condition because of the negative voltage applied to its base through resistor R39.

Responsive to the operation of transistor Q17 to its conducting condition ground is transmitted through the transistor and diode D26 to the coil of relay K13. Since negative voltage is applied to the line side of the coil of relay K13 and ground is applied to the other side of the coil, relay K13 is energized. A path is established from a line to a link or register. This condition is detected by any well-known seize detection circuitry. A seize detect relay K14 not shown in the seize detector circuitry operates when a path through the network is seized. Relay K14 on operating closes its contacts K14–1. The closure of contacts K14–1 applies positive voltage to the base of transistor Q17 over a path including contacts K13–2, coil of K13, contacts K13–1 and diodes D22, D28 to ground. Responsive to the positive voltage, transistor Q17 switches off so as to prevent any other relays associated with the vertical 37 from operating. The positive voltage propogates to the other stages through isolating diodes D34, D35, to similarly busy-out associated verticals and hold the associated relays.

More particularly, positive voltage also extends through diode D34, contacts K12–2, the coil of relay K12, contacts D12–1 and through diodes D31 and 32 to ground in control circuit 28. In addition, the positive voltage is extended through contacts K12–2, diode D33, contacts K11–2, the coil of relay K11, contacts K11–1 diode D12 and diode D7 to ground.

The scanners can continue their operation for locating other circuits to connect other calls. The verticals associated with the operated relays are busied out by the operation of associated transistors. For example, transistor Q3 and Q16 turn off once again so as to inhibit the reed relay cross point associated with the verticals.

Means are provided for removing the holding voltage when a call is released. For example, in FIG. 6, the operate circuit for relay K14 is broken and contacts K14–2 open to remove the holding voltage and thereby release the entire connection.

Similarly, in FIG. 6 when the calling subscriber, for example, goes on hook a signal is sent to detect circuit 84 which causes that circuit to apply negative voltage through R35 to turn off transistors Q9 and Q11. In the absence of the positive voltage through transistor Q11, the entire connection releases.

The circuitry of FIG. 5 may be similarly released. A detect circuit at the link may effectively remove the signal received at circuits such as 14 thereby releasing the call.

Thus, the path selection system operates with a variety of different types of cross point elements using minimal amounts of control equipment. Every possible path is nonetheless scanned on a time multiplex basis using only a counterlike scanner to enable cross point element biasing circuits between the first and second stages and a similar arrangement to enable cross point element biasing circuits between the second and third stages and between the last stage and the output circuits. The output circuits extend the calls to called parties in a manner similar to the mode of connection from the calling end to the "output" circuit.

While the principles of the invention have been described above in connection with specific apparatus and applications it is to be understood that this description is made only by way of the example and not as a limitation on the scope of the invention.

What is claimed is:

1. A path system for selecting a path from an input circuit requesting service to an allotted output circuit through a multistage network, each of said stages comprising a plurality of matrices, each of said matrices comprising a plurality of overlapping input and output multiples, means for linking the output multiples of the preceding stages to the input multiples of the succeeding stages, means for linking each of a plurality of said input circuits to at least one input multiple of the first of said stages, means for linking each of a plurality of said output circuits to at least one output multiple of the last of said stages, element cross point elements coupled between said input and said output multiples at the points of overlapping, said cross point elements capable of being switched between a conducting state and a nonconducting state to interconnect said overlapping multiples in the conducting state and to disconnect said overlapping multiples in the nonconducting state, a control circuit attached to each output multiple linked to a succeeding stage, said control circuits comprising blocking means for inhibiting the cross point elements coupled to the output multiple to which said control circuit is attached to prevent said inhibited cross point elements from switching from the nonconducting state to the conducting state, said blocking means being operational in an unallotted condition of said control circuit, said control circuit further comprising enabling means for enabling the cross point elements coupled to the output multiple to which said control circuit is attached to enable the said cross point elements to switch from the nonconducting state to the conducting state, said enabling means operated responsive to said control circuit being allotted, said input circuits having means for applying a first plurality input signal to the input multiples to which said input circuits are attached to operate an enabled cross point element, and said output circuits having means for applying second plurality signals to said output multiplies to which said output circuits are linked for holding cross point element in the conducting condition, whereby said enabled cross point elements coupled to the input multiples carrying said signal of said first polarity are operated to the conducting state and held in said conducting state by said second polarity signal when a path is switched through from the input circuit requesting service to the allotted output circuit.

2. The path selection system of claim 1, wherein said control circuits further comprise busy means for busying the output multiples to which said control circuits are attached, and said busy means operated responsive to a path selected and switched through said network.

3. The path selection system of claim 2 wherein said output circuits include the means for enabling, blocking and busying the output multiples of said last stage.

4. The path selection system of claim 3 wherein allotter means are provided, said allotter means comprising first scanner means, said first scanner means including means for sequentially applying a scanning signal to said control circuits attached to the output multiples of said first stage matrices, and said allotter means further comprising second scanner means for sequentially applying a scanning signal to each of said link circuits attached to the output multiples of said last stage.

5. The path selection system of claim 4 wherein said network comprises three stages, and wherein the control circuits attached to the output multiples of said second stage are allotted by said second scanner means operating through the control circuits in said output circuit means.

6. The path selection system of claim 5 wherein said scanner outputs are each connected to a gate circuit, said gate circuit operated responsive to the receipt of both said scanner signal and a request for service signal received from the control of any of said input circuits.

7. The path selection system of claim 5, wherein said cross point elements comprise silicon controlled rectifiers, each of said silicon controlled rectifiers being coupled to individual ones of said input and said output multiples, first resistor means individually connected between the gate of each of said silicon controlled rectifiers and said input multiple for biasing said silicon controlled rectifiers, gate diode means individually coupled between the gates of each of said silicon controlled rectifiers and said control circuit to couple the output of said control circuit to the gate of said silicon controlled rectifier, and wherein said blocking means comprises means in said control circuit for reverse biasing said gate diode means when said control circuit is not receiving a scanning signal.

8. The path selection system of claim 1 wherein said means for reverse biasing said gate diode comprises first transistor means, means for coupling the base of said first transistor to receive said scanning signal, bias voltage means sufficient to reverse bias said gate diode when said first polarity signal is applied to said gate diode through said gate resistor, means for coupling the collector of said transistor to said gate diode, means for coupling said bias voltage means to the emitter of said first transistor, means for switching said first transistor to its nonconducting state responsive to a scanning signal received at the base of said first transistor, and means responsive to said first transistor being switched to its nonconducting position for enabling all of said gate diodes coupled to the collector of said first transistor whereby the silicon controlled rectifier coupled to the input multiple receiving the first polarity signal switches to its conducting state to extend said first polarity signal to the attached output multiple.

9. The path selection system of claim 8 wherein each of said control circuits further comprises:

second transistor means, means for coupling the emitter of said second transistor means to the said output multiples to which the control circuit is attached, means for coupling the collector of said second transistor to the base of said first transistor, and means for biasing the base of said second transistor so that said second transistor switches to a conducting state responsive to said second polarity signal being extended to said output multiple to which said control circuit is attached from said allotted output circuit through the succeeding stages, means for biasing said first transistor to switch to its conducting state responsive to said second transistor switching to its conducting stage whereby all of the gate diodes connected to the collector of the first transistor are once again reverse biased to thereby busy out all of the silicon controlled rectifiers attached to said gate diodes except for the silicon controlled rectifier which is already switched to its conducting condition.

10. The selection system of claim 5 wherein said cross point elements comprises reed relay means.

11. The path selection system of claim 10 wherein said reed relay means comprises a single reed relay having a single winding at each of said cross points, means for coupling one end of each of the coils of said reed relays to the overlapping input multiple, means for coupling the other end of said relay coils to an output of said control circuit attached to the overlapping common output multiple, means for coupling contacts of said reed relays between said overlapping input multiples and output multiples at said point of crossing of said multiples, the outputs of said control circuits connected to the coils of said reed relays acting to inhibit the operation of the reed relays when said connected control circuits are nonallotted and acting to enable the reed relays when said connected control circuits are allotted so that a signal of first polarity applied to the input multiple having one of the enabled reed relays attached thereto will cause current to flow through the coil of the enabled reed relay and operate said enabled reed relay.

12. The path selection system of claim 9 wherein said control circuits each comprise a third transistor, means for biasing the base of said third transistor to cause said third transistor to be in a conducting state, means for attaching the base of said third transistor to receive a signal in the nonallotted condition that cancels out said bias and causes said transistor to switch to the nonconducting state and to receive a scanning signal in the allotted condition to cause said transistor to switch to the conducting state, voltage means attached to the emitter of said third transistor to cause one of said reed relays attached to the common output multiple to operate when said third transistor is in its conducting state and said first polarity signal is coupled to the input multiple to which said one of said reed relays is attached, whereby the operation of said third transistor to its conducting state responsive to a scanning signal applied to the base of said third transistor enables said one of said reed relays to operate to switch through said cross point by closing said contacts attached between said input and said output multiples.

13. The path selection system of claim 12 including means in each of said control circuits for extending said second polarity signal through said reed relay coil to the base of third transistor to cancel the bias voltage at the base and thereby to cause said third transistor to switch to its nonconducting state, isolating diode means coupled between the base of said third transistor and said bias voltage source at the emitter of said third transistor, whereby a holding circuit is completed through the coil of said switched reed relay and all of the other reed relays attached to the emitter of said third transistor are blocked.

14. The path selection system of claim 5 wherein said cross point elements comprise integrated circuit components including a first two input gate means, means for coupling a lead of the input multiple at the cross point to one of said two inputs, means for coupling the output of said first two input gates to a lead of said output multiple at said cross point, second two input gate means, means for coupling a lead of the output multiple to one of said inputs at the second two input gate means, means for coupling the output of said second two input gate means to a lead of said input multiple at said cross point, flip-flop means having one of its outputs connected to the other input of said first and second two input gate means, and means for setting said flip-flop to mark said one output responsive to receiving both a signal of said first polarity, and a signal from said control circuit attached to the output multiple at said cross point in the allotted condition.

15. The path selection system of claim 14 wherein said control circuit comprises integrated circuit components.

16. The path selection system of claim 15 wherein at least one of said control circuits comprise a control circuit OR gate for providing a marked output responsive to a signal said second polarity signal, and means for resetting all of said flip-flop circuits except said flip-flop circuit that is already providing a marked output to said two input AND gates responsive to the receipt at said control circuit of said second polarity signal.

* * * * *